Patented Sept. 12, 1933

1,926,648

UNITED STATES PATENT OFFICE 1,926,648

PURIFICATION OF SULPHUR-OIL COMPOSITIONS

Paul O. Powers, Pensacola, Fla., assignor to Newport Industries, Inc., Milwaukee, Wis., a corporation of Delaware No Drawing. Application April 4, 1932
Serial No. 603,205

10 Claims. (Cl. 260—17)

This invention relates to the removal of impurities from sulphur containing compositions.

More specifically, this invention relates to the purification of "cutting" oil bases obtained by treating terpenes with sulphur.

In the manufacture of materials for use as "cutting" oils in metal working, it has heretofore been proposed to treat terpenes such as, for example, pine oil, turpentine, pinene, terpineol, and the like either singularly or admixtures of the same with sulphur. The sulphur base thus obtained is then incorporated in a lubricating material such as a petroleum lubricating oil. This method of forming a sulphur base with a terpene renders it possible to incorporate sulphur into a lubricating oil, since, as is known, sulphur will not combine directly with lubricating oils such as petroleum oil to form a stable composition.

In the U. S. Letters Patent to Kobbe No. 1,844,400 dated February 9, 1932, there is disclosed a process of producing a novel lubricating composition for use as a "cutting" oil which comprises heating two parts of a terpene such as pine oil with one part of sulphur for about a half hour at temperatures below 250° C. The sulphur passes completely into the pine oil forming a homogeneous mass. It is known, however, that the mass obtained is not entirely stable since, upon standing, sulphur gradually crystallizes therefrom.

The sulphur-terpene base formed, when incorporated into a lubricating oil and used as a "cutting" oil in working with metals such as brass and copper, has a corroding or staining action upon these metals. I have now discovered that this corroding action is due to impurities contained in the sulphur-terpene base.

Furthermore, the sulphur-terpene oil base, in addition to its corrosive properties, has a very disagreeable odor.

It has been proposed to purify or remove these objectionable qualities from sulphur-terpene bases by subjecting them to purification treatments such as distillation, steaming, and the like. These attempts at purification have been unsuccessful due to the fact that the corrosive and odoriferous constituents of the cutting oil bases are soluble in the base itself and cannot be removed without also breaking up the sulphur-terpene compounds formed and thus liberate free sulphur.

I have now discovered a method of purifying sulphur-terpene bases so as to render them entirely free of corrosive and staining properties and also greatly improve their odor so that they are in no way objectionable to the user.

It is therefore an object of this invention to provide a method of purifying a sulphur-terpene composition to render it non-corrosive and practically odorless.

It is a further object of this invention to remove the odoriferous and corrosive impurities present in sulphur-terpene "cutting" oil bases obtained by reacting sulphur with terpenes such as pine oil and the like.

It is a further object of this invention to produce a substantially odorless, non-corrosive, sulphur-containing "cutting" oil base.

Other and further objects of this invention will become apparent as the description proceeds.

The usual method of manufacturing sulphur-containing "cutting" oil bases consists in adding sulphur in amounts as high as 50%, to a terpene oil, heating the mixture to a temperature not far from the boiling point of the oil until all of the sulphur is combined. I have discovered that when sulphur is combined with terpene oils such as pine oil in this way, the chief impurities which cause corrosiveness and bad odors are mercaptans and hydrogen sulphide. These reaction products are soluble in the sulphur-treated oil and cannot be steamed out of the oil without also breaking up the sulphur terpene compounds.

I have now found that the impurities, such as mercaptans and hydrogen sulphide, may be readily removed from the sulphur-terpene composition by agitating the composition with one or more portions of a dilute alkaline solution at temperatures sufficiently high so that after agitation, the sulphur-terpene and alkaline solution will readily separate into two layers. The sulphur-terpene composition is then given one or more successive washes with hot water until all of the impurities which have reacted with the alkaline solution to form a soluble sulphur compound are removed. A simple test to determine whether or not the impurities have been completely removed is to add a few drops of copper sulphate solution to the wash water and note when there is no longer any brown coloration formed.

Any alkaline solution may be used which is immiscible with the sulphur-terpene composition. While aqueous solutions are generally preferred because of their cheapness, other inert solvents which are immiscible with the sulphur-treated terpene composition may be used.

As alkaline solutions I prefer to use aqueous solutions of sodium or potassium hydroxide.

Without limiting my invention to any particular procedure, the following example, in which parts by weight are given, will serve to illustrate my process in its preferred form.

*Example*

100 parts of the sulphur-terpene composition obtained in the specific example given in U. S. Patent No. 1,844,400 is agitated with 6 parts of caustic soda in 20% water solution at about 90° C. The caustic solution being immiscible with the terpene composition is next separated therefrom. The terpene base is then washed with water until no coloration appears in a sample of the last wash water upon addition of copper sulphate solution. Usually three washings with 20% of water each time is sufficient. After each water wash the oil is kept just under the boiling point so that the water wash will separate as clearly as possible. After the last water wash the mass is dehydrated by boiling off any occluded or dissolved water. The dehydration is best accomplished by heating under vacuum, so that a temperature below 100° C. will distill off all of the water. The oil will not decompose at temperatures below 100–110° C. Upon cooling the oil is ready for use as a cutting oil base, has a very mild odor, and is entirely non-corrosive.

From the above description it is apparent that I have provided a process for the removal of impurities in sulphur-terpene compositions to render them commercially useful. The purification process is inexpensive and exceedingly simple in operation. The results obtained by the process make it possible to utilize a valuable composition which was heretofore considered of very little value because of the corrosive and odoriferous impurities which were always present therein.

I am aware that numerous details of the invention may be varied through a wide range without departing from the spirit of this invention, and I do not desire limiting the patent granted hereon other than necessitated by the prior art.

I claim as my invention:

1. In the process of preparing an odorless, non-corrosive cutting oil, the step which comprises treating the mass obtained by reacting sulphur and a terpene with an alkali metal hydroxide solution immiscible with the sulphur-terpene product capable of reacting with sulfur to form a salt soluble in the solution, separating the alkaline solution therefrom, and washing the sulphur-terpene composition in an aqueous medium to remove the reaction products of the impurities with the alkali metal hydroxide solution.

2. In the process of preparing a sulphur-terpene reaction product, the step which comprises mixing said product with an aqueous alkali metal hydroxide solution, removing the excess hydroxide solution, washing the so treated product with water until the wash water shows no coloration upon addition of copper sulphate solution, and removing any occluded water by heating the mass to temperature about 100° C.

3. The process of purifying the product obtained by reacting a terpene with sulphur to remove corrosive and odoriferous impurities which comprises agitating the reaction product with an aqueous solution of an alkali metal hydroxide, separating the aqueous solution from the reaction product, and washing the reaction product with water.

4. The process of purifying a sulphur-terpene reaction product which comprises agitating said product with an alkali metal hydroxide, said hydroxide being dissolved in an inert solvent immiscible with said product, separating the product from the alkali solution, washing the product with an inert solvent to dissolve out the alkali metal compounds formed and heating the product to drive off any occluded or dissolved solvent at temperatures insufficient to cause decomposition of the oil base.

5. The process of purifying a sulphur-terpene oily reaction product which comprises agitating said oil with an aqueous solution of an alkali metal hydroxide, separating the oil from the aqueous solution, washing the oil with water to dissolve out the alkali metal sulphur compounds formed and heating the oil to temperatures not exceeding 100° C. under vacuum to drive off occluded or dissolved water.

6. The process of purifying an oily sulphur-terpene reaction product which comprises agitating said oily reaction product with a 20% solution of caustic soda at 90° C., separating the caustic solution from the oil, washing the oil with water to remove the sodium-sulphur compounds formed with the caustic soda treatment and heating the oil to temperature about 100° C. to drive off any occluded or dissolved water.

7. The process of purifying the product obtained by reacting one part of sulphur with two parts of pine oil, which comprises agitating said product with 6% of caustic soda in 20% solution at 90° C., separating the reaction product from the caustic soda solution, washing the product with water and removing any occluded or dissolved water by heating the reaction product to temperatures above 100° C.

8. In the process of purifying the product obtained by treating a terpene with sulphur, the step which comprises agitating said product with an aqueous solution of an alkaline metal hydroxide.

9. A sulphur-terpene reaction product substantially free from corrosive and odoriferous impurities.

10. A non-corrosive substantially odorless sulphur-containing terpene oil free from mercaptans and hydrogen sulphide impurities.

PAUL O. POWERS.